No. 618,769. Patented Jan. 31, 1899.
F. BARTO.
BICYCLE COUPLING.
(Application filed Aug. 27, 1897.)
(No Model.) 2 Sheets—Sheet 1.

WITNESSES:
INVENTOR
F. Barto
BY
ATTORNEYS.

No. 618,769. Patented Jan. 31, 1899.
F. BARTO.
BICYCLE COUPLING.
(Application filed Aug. 27, 1897.)
(No Model.) 2 Sheets—Sheet 2.
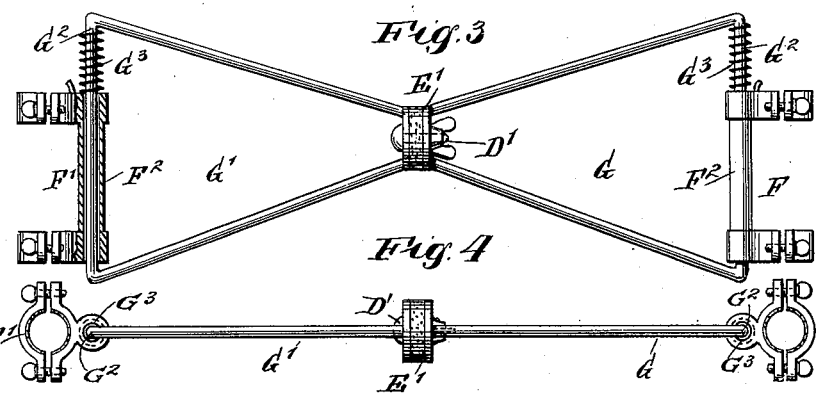
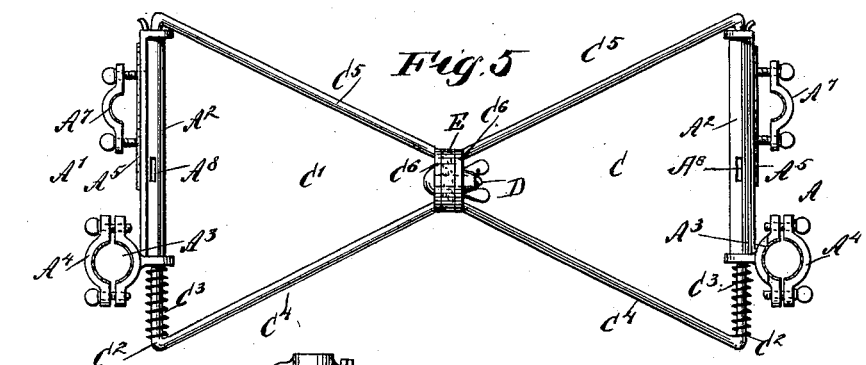
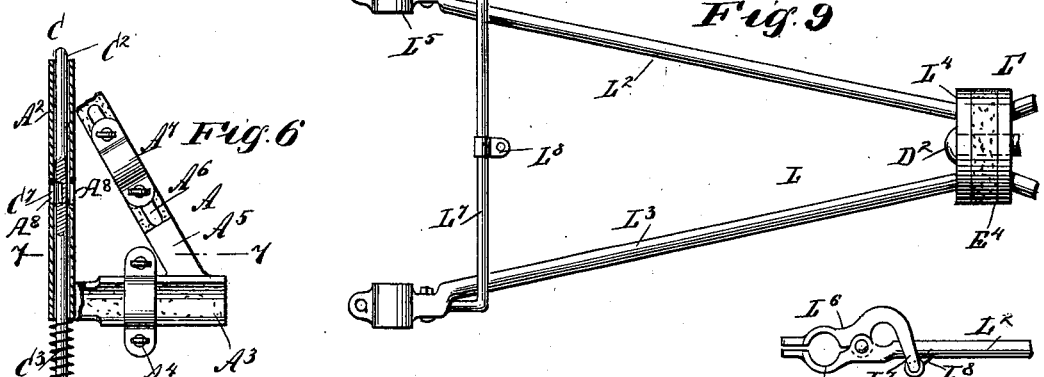
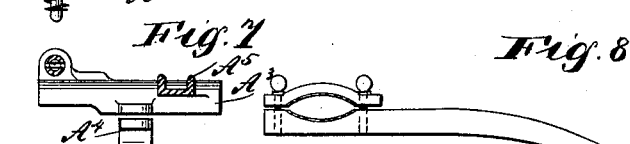
WITNESSES:
INVENTOR
F. Barto
BY
ATTORNEYS.
THE NORRIS PETERS CO., PHOTO-LITHO., WASHINGTON, D. C.

UNITED STATES PATENT OFFICE.

FRANK BARTO, OF NEW YORK, N. Y.

BICYCLE-COUPLING.

SPECIFICATION forming part of Letters Patent No. 618,769, dated January 31, 1899.

Application filed August 27, 1897. Serial No. 649,705. (No model.)

*To all whom it may concern:*

Be it known that I, FRANK BARTO, of New York, (Brooklyn,) in the county of Kings and State of New York, have invented a new and Improved Bicycle-Coupler, of which the following is a full, clear, and exact description.

The invention relates to couplers for connecting two safety-bicycles with each other side by side; and the object of the invention is to provide a new and improved bicycle-coupler which is simple and durable in construction, easily applied to the two machines, conveniently disconnected and folded when not in use, and arranged to connect bicycles of different lengths of frame and to allow one of the bicycles to readily travel over ruts or rough ground without jarring the other bicycle and its rider.

The invention consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figure 1:
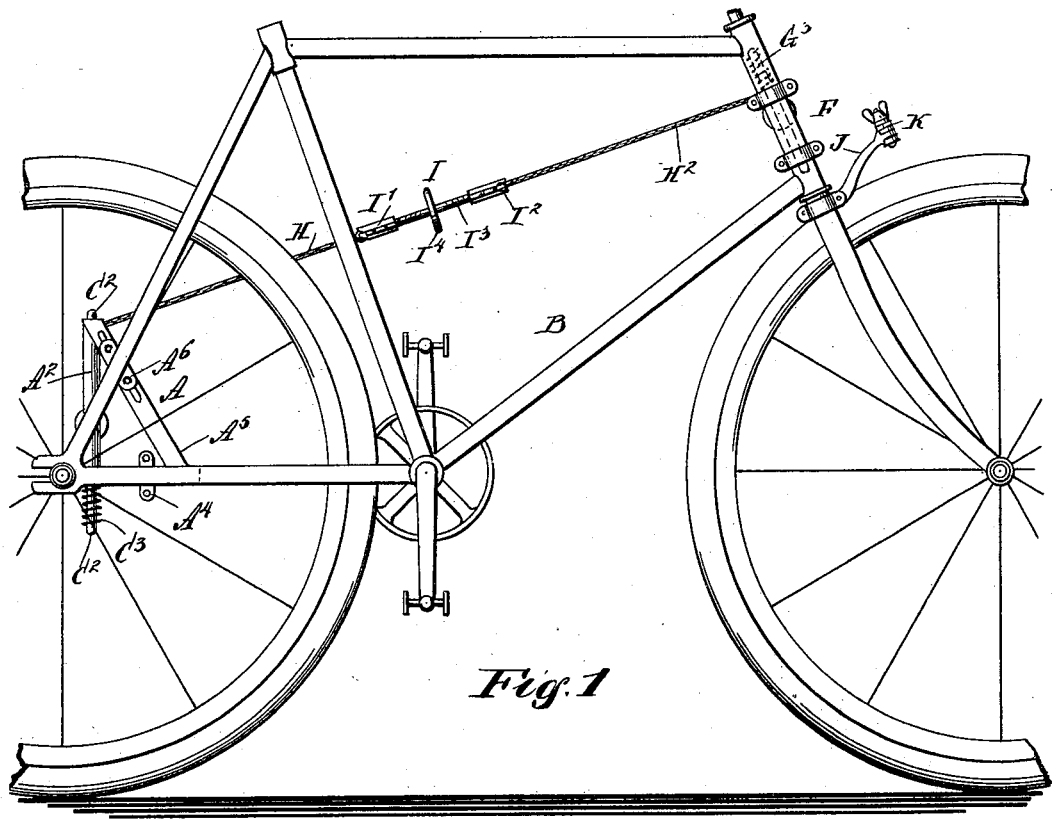
Figure 2:
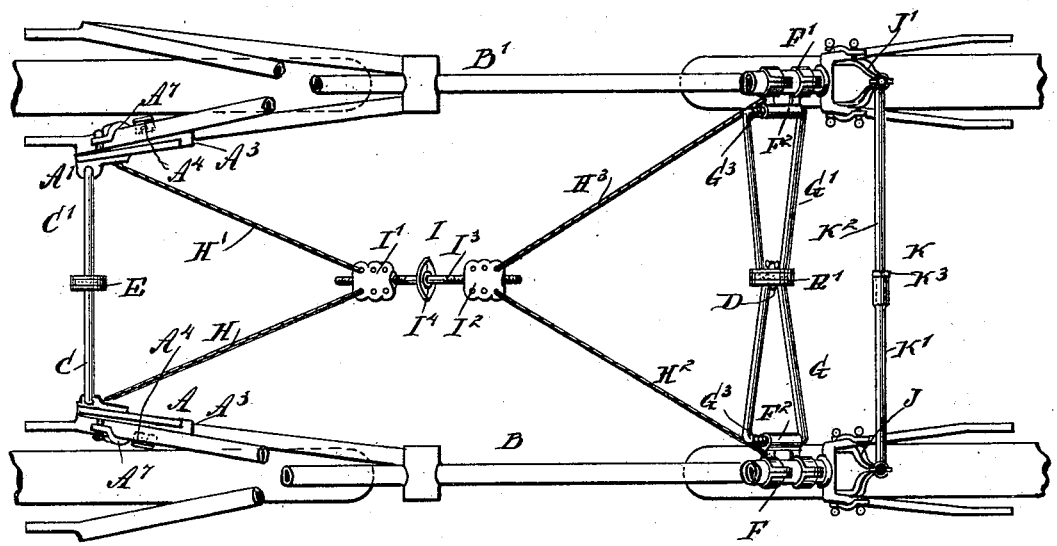

Figure 1 is a side elevation of the improvement as applied. Fig. 2 is a plan view of the same. Fig. 3 is an enlarged end elevation with part of the front frame in section. Fig. 4 is a plan view of the same. Fig. 5 is an enlarged end elevation of the rear cross-frame. Fig. 6 is an enlarged sectional side elevation of one of the brackets for the rear cross-frame, the clamp being shown in elevation. Fig. 7 is sectional plan view of the same on the line 7 7 in Fig. 6. Fig. 8 is an enlarged plan view of the steering-fork bracket and connecting-rod. Fig. 9 is an enlarged end elevation of a modified form of connecting-frame, and Fig. 10 is a plan view of the same.

The improved device is provided with two triangular brackets A A' for attachment to the frames of the bicycles B B' to be coupled together. On the brackets A A' are pivoted and mounted to slide vertically triangular arms C C', connected with each other at their free ends by a bolt D and having a block E, of rubber or other elastic material, between said ends. On the steering-heads of the two bicycles B B' are clamped brackets F F', respectively, on which are pivoted and mounted to slide upwardly triangular arms G G', likewise adapted to be connected with each other at their free ends by a bolt D' and having an elastic block E' intervening said ends. (See Figs. 2, 3, and 4.)

On the brackets A A' are attached guy-ropes, links, chains, or like devices H H', respectively, and similar devices $H^2 H^3$ are connected with the brackets F F', respectively. The said devices H H' and $H^2 H^3$ are connected with the nuts $I' I^2$ of a turnbuckle I, provided with the usual screw-rod $I^3$, screwing in the said nuts $I' I^2$ to draw the nuts toward each other or move the same apart upon turning the hand-wheel $I^4$, attached to the screw-rod $I^3$. The nuts $I' I^2$ are provided on the sides with rows of apertures for connecting the corresponding devices H H' $H^2 H^3$ at such points on the turnbuckles, according to the length of the frames of the bicycles, in case the latter are of even or uneven lengths.

Each of the brackets A A' is formed with a vertically-disposed bearing $A^2$, in which the vertical rod $C^2$ of the corresponding arm C or C' is journaled and free to slide vertically, and at the lower end of the said bearing $A^2$ a spring $C^3$ is coiled on the lower projecting end of the rod $C^2$. The lower end of the spring $C^3$ rests on the lower rod $C^4$ of the arm C or C', as is plainly indicated in Fig. 5, and this rod $C^4$ is joined with the upper rod $C^5$ on a disk $C^6$, forming the inner end of the arm C or C'. The two disks $C^6$ carry the bolt D, the block E' of elastic material being between the disks.

Now by the arrangement described the arms C C' form a connecting-frame between two bicycles, and said frame is free to yield in a vertical direction, so as to compensate for inequalities of surface, as when the rear wheels of the bicycles travel over uneven ground, ruts, or the like, either singly or simultaneously, and without causing undue jar from one bicycle to the other.

Each of the brackets A A' is provided with a horizontal clamp having one half $A^3$ rigid on the bearing $A^2$ and the other half $A^4$ adjustable by the usual bolts to engage the lower rear brace of the bicycle-frame, as is plainly shown in Figs. 1 and 2. Each bracket A A' is further provided with a second clamp consisting of two parts $A^5$ and $A^7$, the part $A^5$ forming a rigid connection between the clamp at A³ and the bearing A², and the part A⁷ is adjustably held on the fixed part at A⁶ to engage the upper rear brace at the inside of the bicycle-frame. By this arrangement the brackets A A' can be readily attached to most bicycle-frames, as the clamp part A⁷ can be adjusted to reach the upper rear brace after the bracket parts A³ A⁴ are clamped to the lower brace of the bicycle-frame. The bearing A² will remain vertically disposed, so as to allow an upward yielding of the connecting-frame between the two brackets A A'.

When the device is not to be used, the bolt D is simply removed from one of the disks C⁶ to permit of swinging the arms C C' rearwardly, and then a pin, a plug of wood, a nail, or the like is passed through registering apertures A⁸ C⁷, formed in the bearing A² and the rods C², respectively.

The arms G G' when connected with each other, as described, form a similar yielding connecting-frame between the brackets F F', the said arms G G' being likewise triangular in shape, the arms G² being fitted to slide upwardly and to turn in the bearing F² formed on each bracket F F'. A spring G³ engages the projecting end of the rod G², so as to allow the arms G G' to yield in an up or down direction when one of the bicycles travels over uneven ground, ruts, or the like.

On the front forks of the bicycles B B' are formed brackets J J', connected with each other by a transverse rod K, made in sections K' K², screwed together and fastened in place by a jam-nut K³, as is plainly indicated in Fig. 2. Each of the brackets J J' is made, as plainly indicated in Fig. 2, so as to leave sufficient space between the arms of the bracket for a brake-rod or the like to pass down to the tire of the wheel.

I do not limit myself to the construction of the cross-frames as shown, as it is evident the same may be varied without deviating from my invention. For instance, the cross-frames may be constructed as shown in Figs. 9 and 10, in which the frame is made of two arms L L', alike in shape, and each having two arms L² L³, connected at one end to a disk L⁴ for engaging the elastic block E⁴, the two disks of the two arms being connected with each other by the usual bolt D². The other ends of the arms L² L³ are formed into half-clamps L⁵, on which are pivoted the usual half-clamps L⁶, and the two clamp parts L⁶ are connected with each other by a vertically-disposed rod L⁷, having a lug L⁸ for connection with the corresponding device H, H', H², or H³.

Having the cross-frames jointed at the middle, as above described, permits of a very compact folding of the entire coupler, as the cross-arms C C' or G G' when disconnected can be swung into a longitudinal position, either forward or backward, on the corresponding bicycle and then locked in place, as above described.

When it is desired to disconnect the two bicycles for allowing the riders to travel independently over a rough road, narrow path, or the like, then the cross-arms C C' and G G' are disconnected and the rod K is separated, and one of the said guy devices H H² or H' H³ is disconnected from the corresponding pair of brackets, so that the two machines are entirely disconnected. Thus each bicycle carries about half of the entire coupler, and when the bicycles are thus disconnected they can be separately ridden over bad places in the road or along a narrow path until a better stretch of road is reached, when the several parts are again connected with each other, as above explained. If desired, the entire device can be removed from the machines and the several parts disconnected and placed in a small bag or other receptacle carried on one of the machines.

The upwardly-yielding connection described permits a side twist to accommodate bicycles of different heights of frame, and by having both rear and front cross-frames for connecting the frames of the bicycles with each other all strain is removed from the forks of the machines, and as the forks are connected independently of the coupler-frame it is evident that the coupled bicycles are easily steered without danger of straining either of the machines. Furthermore, the pivotal connection between the brackets J J' and the rod K is in the central vertical plane of the front wheels of the machines, so that it requires but little power to accomplish steering in the desired direction.

By reference to Fig. 8 it will be seen that each bracket J or J' has two separate arms clamped to the members of the fork, so as to bring the strain incident to steering on both fork members instead of only one member. By having separate arms the bracket can be readily applied to forks having their members farther apart or nearer.

By having the turnbuckle I and the nuts with various points of attachment for the guy-ropes it is evident that the operator is enabled to properly square the entire coupling-frame by turning the screw-rod I³, as above explained, so that a proper connection is made between the two bicycles.

Having thus fully described my invention, I claim as new and desire to secure by Letters Patent—

1. A bicycle-coupler provided with a cross-frame made in two parts, the said parts being detachably connected with each other at their free or inner ends by a bolt and provided with a block of elastic material between said ends, the outer end of each part of the said frame being pivotally connected with the bicycle-frames to be coupled, substantially as described.

2. A bicycle-coupler provided with brackets for attachment to the bicycle-frames to be coupled, each bracket having a bearing, a cross-frame consisting of two triangular-shaped arms, a detachable connection between the inner ends of said arms, the outer end of each of said arms being pivoted in the respective bearings and free to slide up and down therein, and springs pressing on the said frames to allow the same to yield in their bearings, substantially as shown and described.

3. A bicycle-coupler comprising a pair of brackets for attachment to the bicycle-frames to be coupled, each bracket being formed with a bearing, cross-frames connecting respectively the front and rear portions of the bicycle-frames, each cross-frame consisting of two triangular-shaped arms detachably connected with each other at their inner ends, the outer ends of the said arms being pivoted in the respective bearings and free to slide therein, and means for connecting the brackets with each other, substantially as set forth.

4. A bicycle-coupler comprising a front and a rear cross-frame each made in two parts, each part being provided with a disk at its inner end, a bolt connecting the two disks of the said parts with each other and a block of elastic material between the disks, the other ends of said parts of each of the cross-frames being pivotally connected with the bicycle-frames to be coupled and arranged to yield upwardly, and a cross-rod arranged to connect the forks of the bicycles to be coupled, substantially as shown and described.

5. A bicycle-coupler provided with a cross-frame made in two parts, a detachable connection between the inner ends of the said parts, bearings connected with the bicycle-frame to be coupled and in which the outer ends of the said parts are mounted to turn, whereby when the two parts of the cross-frame are disconnected at their inner end, the said parts can be swung into a longitudinal position on the corresponding bicycle-frame, and means for locking the parts of the cross-frame in said longitudinal position, substantially as set forth.

6. A bicycle-coupler comprising a pair of brackets for attachment to the bicycle-frames to be coupled, each bracket having a bearing, a cross-frame formed in two parts and having a detachable connection between the inner ends of said parts, each of said parts of the cross-frame at its outer end being pivoted in the corresponding bearing, each part of the cross-frame being mounted to yield upwardly in its bearing and also to turn therein when the said parts are disconnected, the said bearings and the portions of the cross-frame mounted therein being provided with apertures adapted to register with each other when the parts of the cross-frame are turned in the bearings, as and for the purpose set forth.

FRANK BARTO.

Witnesses:
THEO. G. HOSTER,
JNO. M. RITTER.